June 29, 1965     W. DZUS     3,191,485
THREADED FASTENING DEVICE
Original Filed Sept. 3, 1959
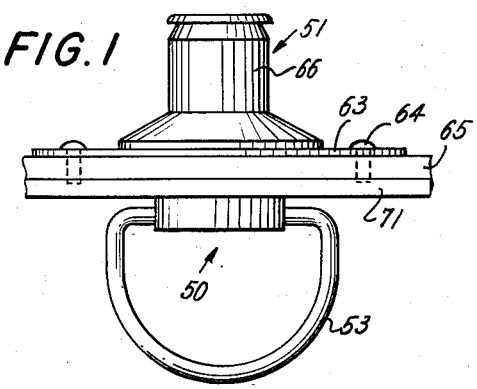
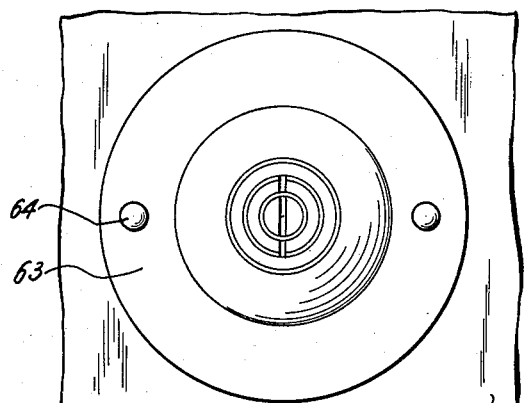
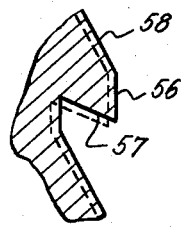
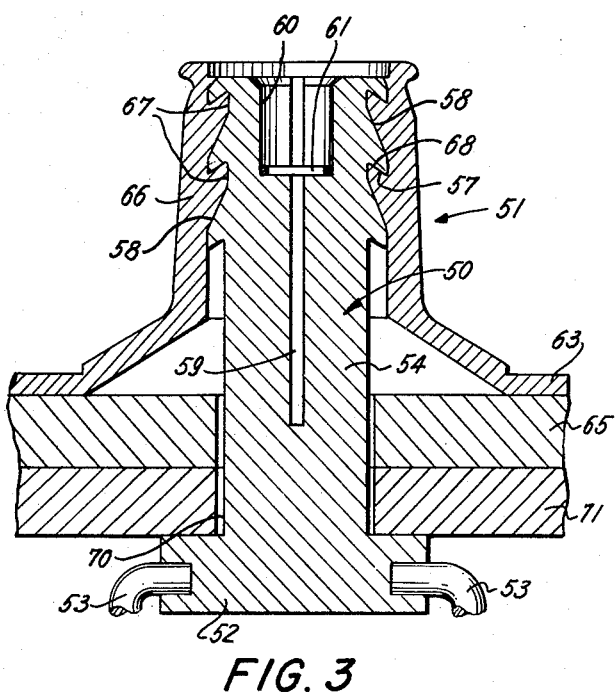
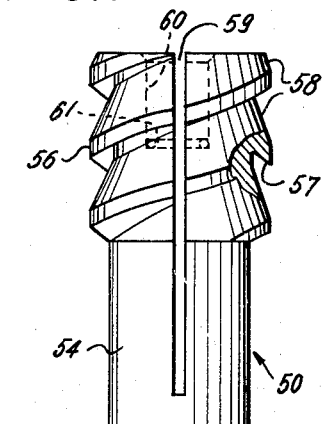
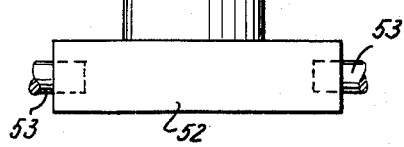
INVENTOR.
WILLIAM DZUS
BY
ATTORNEY 3,191,485
THREADED FASTENING DEVICE
William Dzus, West Islip, N.Y.; Theodore Dzus, Francis X. Clarke, and Daniel H. Kane, executors of said William Dzus, deceased
Original application Sept. 3, 1959, Ser. No. 837,907. Divided and this application Sept. 11, 1962, Ser. No. 222,813
1 Claim. (Cl. 85—1)

This application is a division of my patent application Serial No. 837,907, filed on September 3, 1959, and now abandoned, and which in turn was a continuation in part of my application, Serial No. 728,959, filed on April 17, 1958, now Patent No. 3,046,828.

This invention relates to improved threaded fastening devices.

My invention is particularly applicable to threaded fastening devices consisting of a male screw member having an external helical thread such as a screw or bolt and a female screw member having a complementary internal helical thread such as a nut or receptacle. The two members are interengageable and releasable upon relative rotation of one member with respect to the other.

The threads used in fastening devices of this type have had recognized disadvantages. Thus where high loads, particularly tension loads, are applied to such fastening devices the threads heretofore used exerted a wedging action upon the nut or receptacle causing it to spread so as to release the interengagement between the male and female members. Because of this condition, the ultimate strength of the fastening device, particularly in tension, is frequently determined by this wedging or spreading action caused by the threads rather than by the ultimate strength of the materials from which the members are made.

It is a particular object of the present invention to overcome the difficulties encountered in this respect and to provide an improved thread for fastening devices of this type which will not cause spreading of the nut or receptacle when loads are applied to the fastening device but on the contrary will cause a compressive action upon the nut or receptacle and an expansive force on the stud causing them to tightly grip each other augmenting the engagement between the threads and causing them to reinforce each other and thereby increasing the strength of the fastening device.

My invention contemplates the provision of an improved fastening device having interengageable members with complementary threads formed with load carrying side walls presenting interengaging, overhanging, concave or re-entrant surfaces. The male member is resilient and is relatively expandable and contractible and when the members are stressed in tension, the re-entrant surfaces of the side walls of the threads exert a camming action causing the female fastening member to tightly engage the male fastening member.

Referring to the accompanying drawing:

FIG. 1 is a side elevational view of a fastener assembly embodying my invention in which the stud member is relatively expandable and contractible;

FIG. 2 is a top plan view of the fastener assembly;

FIG. 3 is a cross-sectional view of the assembly;

FIG. 4 is an enlarged sectional detailed view of a portion of the threads of the stud showing the relatively expanded or stressed position of the threads in full lines and the relatively contractive or relaxed position of the threads in dotted lines; and, FIG. 5 is a side elevational view of the modified form of stud used in the assembly of FIG. 1.

In FIGS. 1–5 inclusive I have shown a fastener assembly embodying my invention in which the stud member 50 is relatively expandable and contractible and the receptacle member 51 is of relatively fixed diameter. The illustrated stud member is provided with a head portion 52 having an operating ring 53 pivotly secured thereto whereby the stud member may be readily rotated. A shank portion 54 projects from the head portion and near the outer end thereof it is formed with my improved threads 56. Thus the threads 56 have a load bearing surface or wall 57 presenting an overhanging, re-entrant surface forming a re-entrant angle in the root of the threads as clearly shown in FIGS. 3 and 5. The opposite side wall 58 of the threads may be of tapered conventional design. The threaded portion of the stud is made relatively expandable and contractible and is made of resilient material. The desired result may be accomplished by forming one or more slots extending inwardly from the free end thereof through the threaded portion into the unthreaded portion of the shank as most clearly shown in FIGS. 3 and 5.

In the illustrated embodiment the stud is illustrated as divided into two separate sections by a transverse diametric slot. It should be understood that the threaded portion of the stud may be divided into a greater number of smaller sections by providing two or more intersecting diametric slots.

Due to its resilient construction the threaded portion of the stud will normally retain its relaxed contracted position. However when it is stressed in tension in engagement with a receptacle having my improved threads it will expand into tight engagement with the inner surface of the receptacle.

To prevent the threaded portion of the stud from being permanently constricted inwardly beyond its normal relaxed position, I may provide the outer end of the stud shank with an inwardly extending recess 60 as shown in FIGS. 3 and 5 in which a small ring 61 may be tightly fitted and frictionally held in place. The ring 61 serves to prevent the threaded end portion of the stud shank from being constricted inwardly beyond its normal relaxed position.

The receptacle member 51 is formed with an attaching plate 63 having apertures 64 whereby it may be riveted or otherwise secured to a plate 65. Projecting upwardly from the attaching plate is the tubular collar portion 66 which has a relatively fixed diameter. The tubular collar 66 is provided with my improved threads 67 having load bearing side walls 68 presenting an overhanging, inturned, re-entrant surface. The load bearing walls 68 of the receptacle are cooperable to engage the load bearing walls 67 of the stud when the fastener parts are interengaged.

In using the form of fastener device shown in FIGS. 1–5 the stud member is inserted through aperture 70 in plate 71 and through a corresponding aperture formed in plate 65 and thence interengaged with the receptacle. When the stud is tightened so as to stress the fastener parts in tension the load bearing surfaces 57 and 68 of the respective threads 58 and 67 exert a camming action on each other causing the stud segments to expand into tight engagement with the inner surface of the receptacle which in turn causes a resilient, compressive force to be exerted upon the collar of the receptacle with the result that the respective fastener parts reinforce each other.

From the foregoing description of my invention it will be seen that I have provided an improved threaded fastener assembly in which the stud member is relatively expandable and contractible and having improved threads with re-entrant load carrying side wall surfaces causing a camming action which urges the fastener members into engagement with each other and which causes the threads of the respective members to reinforce each other. Modifications may be made in the illustrated and described embodiment of my inventions without departing from the invention as set forth in the accompanying claim.

I claim:

A threaded fastening device comprising a receptacle member formed with a base plate and a projecting relatively rigid, non-contractible and non-expansible tubular portion having internal helical threads and a cooperating stud member having a head portion and a shank portion connected thereto, said shank portion having an external helical thread at the end opposite the head and being unthreaded adjacent the head, said shank portion having a longitudinal slot extending from the threaded end into and terminating in the unthreaded portion whereby the threaded portion of the shank is resilient and expandible and contractible, said external helical thread of the shank portion being complementary to and engageable with the internal thread of the receptacle and said threads presenting confronting, overhanging, re-entrant load bearing surfaces which directly engage each other to exert an expanding force on the shank of the stud member when the members are stressed in tension causing the receptacle and stud members to tightly engage each other, said shank portion being formed with a recess in its outer threaded end and being coaxial with said slot and being of less axial depth than the length of the threaded portion, and having a ring frictionally retained in the inner end of said recess and spaced from the outer end thereof, said ring being of sufficient diameter to maintain the shank portion at the predetermined diameter of a normally relaxed condition of said shank portion and to prevent contraction inwardly beyond said predetermined diameter.

References Cited by the Examiner
UNITED STATES PATENTS

| | | | |
|---|---|---|---|
| 197,473 | 11/77 | James | 85—46 |
| 1,993,996 | 3/35 | Johnson | 151—31 |
| 2,207,005 | 7/40 | Haas | 85—46 |
| 2,407,160 | 9/46 | Kahn | 151—31 |
| 3,046,828 | 7/62 | Dzus | 85—46 |
| 3,115,804 | 12/63 | Johnson | 85—4 |

FOREIGN PATENTS

| | | |
|---|---|---|
| 668,686 | 3/52 | Great Britain. |

EDWARD C. ALLEN, *Primary Examiner.*